US010726984B2

(12) United States Patent
Keltz et al.

(10) Patent No.: US 10,726,984 B2
(45) Date of Patent: Jul. 28, 2020

(54) ELECTROMAGNETIC MODE CHANGE OF PERIPHERAL INTERFACE WHEEL

(71) Applicant: Logitech Europe S.A., Lausanne (CH)

(72) Inventors: Guillaume Keltz, Montaucon (FR); Guillaume Loussert, Besancon (FR); Corentin Le Denmat, Besancon (FR); Jean-Daniel Alzingre, Larnod (FR)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/428,182

(22) Filed: May 31, 2019

(65) Prior Publication Data

US 2020/0005977 A1 Jan. 2, 2020

Related U.S. Application Data

(60) Provisional application No. 62/690,591, filed on Jun. 27, 2018.

(51) Int. Cl.
*H01F 7/06* (2006.01)
*G06F 3/0362* (2013.01)
*G06F 3/0354* (2013.01)
*H01F 7/02* (2006.01)

(52) U.S. Cl.
CPC .......... *H01F 7/064* (2013.01); *G06F 3/0362* (2013.01); *G06F 3/03543* (2013.01); *H01F 7/0205* (2013.01)

(58) Field of Classification Search
CPC .... H01F 7/064; H01F 7/0205; G06F 3/03541; G06F 3/03543; G06F 3/0362
See application file for complete search history.

(56) References Cited

U.S. PATENT DOCUMENTS

| 10,444,872 | B2 * | 10/2019 | Hsueh ................. G06F 3/03543 |
| 2007/0188453 | A1 * | 8/2007 | O—Sullivan ......... G06F 3/0312 345/163 |
| 2019/0121452 | A1 * | 4/2019 | Hsueh ................... G06F 3/0362 |
| 2020/0004346 | A1 * | 1/2020 | Vlasov .................... G06F 3/016 |
| 2020/0005977 | A1 * | 1/2020 | Keltz ..................... H01F 7/064 |

* cited by examiner

*Primary Examiner* — Kent W Chang
*Assistant Examiner* — Nathaniel P Brittingham
(74) *Attorney, Agent, or Firm* — Kilpatrick Townsend & Stockton LLP

(57) ABSTRACT

A user input device including a rotary input control having a wheel and an electropermanent magnet (EPM) assembly, the EPM assembly comprising a permanent magnet and a magnetizing assembly configured to control a polarization of the permanent magnet to transition the electropermanent magnet assembly from a first state in which the EPM assembly applies a first resistance profile to the wheel and a second state in which the EPM assembly applies a second resistance profile to the wheel. The EPM assembly includes magnetically conductive members positioned at opposing ends of the electropermanent magnet, each magnetically conductive member comprising a respective plurality of teeth protruding radially toward the wheel, and each of the magnetically conductive members comprising a respective magnetic pole depending on a polarized state of the EPM assembly.

17 Claims, 12 Drawing Sheets

ELECTROMAGNETIC MODE CHANGE OF PERIPHERAL INTERFACE WHEEL

CROSS-REFERENCES TO RELATED APPLICATIONS

This application is a non-provisional application and claims the benefit and priority of U.S. Provisional Application No. 62/690,591 filed on Jun. 27, 2018, and titled "ELECTROMAGNETIC MODE CHANGE OF PERIPHERAL INTERFACE WHEEL," which is herein incorporated by reference in its entirety for all purposes.

BACKGROUND

Unless otherwise indicated herein, the materials described in this section are not prior art to the claims in this application and are not admitted to be prior art by inclusion in this section.

Physical computer peripheral interface devices can include keyboards, mice, joysticks, wheels, etc., that can be physical devices that a user manipulates to interface with a computer device. Physical computer peripheral interface devices can include wheel input elements that a user can manipulate. For example, computer mice can include scroll wheels that can be used to pan a viewing window across an image or document displayed by a computer device in response to rotating the scroll wheel around an axis. Interface wheels can operate across a plurality of friction profiles. For example, a mouse scroll wheel may operate selectively between a free-wheeling mode and a ratcheting mode each corresponding to a respective friction profile. Mechanisms for more efficiently switching between one or more friction profiles are desirable.

BRIEF SUMMARY

In some embodiments, a user input device includes a rotary input control having a wheel and an electropermanent magnet (EPM) assembly, the EPM assembly comprising a permanent magnet and a magnetizing assembly configured to control a polarization of the permanent magnet to transition the electropermanent magnet assembly from a first state in which the EPM assembly applies a first resistance profile to the wheel and a second state in which the EPM assembly applies a second resistance profile to the wheel. The EPM assembly can include magnetically conductive members positioned at opposing ends of the electropermanent magnet, each magnetically conductive member comprising a respective plurality of teeth protruding radially toward the wheel, and each of the magnetically conductive members comprising a respective magnetic pole depending on a polarized state of the EPM assembly. The wheel may define a central opening within which the electropermanent magnet assembly is disposed and wherein the wheel comprises a second plurality of teeth protruding from the wheel and toward the EPM assembly. The first resistance profile can be a ratcheting resistance profile generated by a magnetic flux emitted by the permanent magnet that flows through the plurality of teeth of the magnetically conductive members to interact with corresponding ones of the second plurality of teeth protruding from the wheel. The permanent magnet may be a first permanent magnet and the electropermanent magnet assembly can further comprises a second permanent magnet, the first and second permanent magnets being aligned and cooperating with the magnetically conductive members to form a magnetic circuit.

In certain embodiments, the user input device may include a shaft that couples the electropermanent magnet assembly to the wheel enabling the wheel to rotate with respect to the electropermanent magnet assembly. The first resistance profile may apply a free-wheeling force to the wheel and the second resistance profile applies a ratcheting force to the wheel. The first resistance profile can be applied by interaction between a magnetic field emitted by the electropermanent magnet assembly and magnetically attractable materials of the wheel. The user input device may be a computer mouse and the wheel may be a scroll wheel embedded within the computer mouse, as shown for example in FIG. 1.

In further embodiments, a method of changing a rotational resistance profile for a rotary input control on a user input device can include receiving an input signal indicating a selection of one of a plurality of rotational resistance profiles for the rotary input control that includes a first operational state and a second operational state; in response to the received input signal corresponding to the selection of the first operational state, causing a magnetizing system to electromagnetically control a magnetic polarization of a permanent magnet of an electropermanent magnet (EPM) system to apply a first resistance profile to the rotary input control; and in response to the received input signal corresponding to the selection of the second operational state, causing the magnetizing system to electromagnetically control the magnetic polarization of a permanent magnet of an electropermanent magnet (EPM) assembly to apply a second resistance profile to the rotary input control. In some aspects, the electropermanent magnet assembly can further comprise magnetically conductive members positioned at opposing ends of the electropermanent magnet, each magnetically conductive member comprising a respective plurality of teeth protruding radially toward the rotary input control. Each of the magnetically conductive members can comprise a respective magnetic pole depending on a polarized state of the EPM assembly. The rotary input control may define a central opening within which the electropermanent magnet assembly is disposed and wherein the rotary input control includes a second plurality of teeth protruding from the rotary input control and toward the EPM assembly, as shown for instance in FIGS. 4A-4C.

In some embodiments, the first resistance profile can be a ratcheting resistance profile generated by a magnetic flux emitted by the permanent magnet that flows through the plurality of teeth of the magnetically conductive members to interact with corresponding ones of the second plurality of teeth protruding from the rotary input control. The permanent magnet can be a first permanent magnet and the electropermanent magnet assembly further comprises a second permanent magnet, the first and second permanent magnets being aligned and cooperating with the magnetically conductive members to form a magnetic circuit. In some cases, the user input device further comprises a shaft that couples the electropermanent magnet assembly to the rotary input control enabling the rotary input control to rotate with respect to the electropermanent magnet assembly. The first resistance profile may apply a free-wheeling force to the rotary input control and the second resistance profile applies a ratcheting force to the rotary input control. In some cases, the first resistance profile is applied by interaction between a magnetic field emitted by the electropermanent magnet assembly and magnetically attractable materials of the rotary input control. The user input device of the method described above may be a computer mouse and the rotary input control may be a scroll wheel embedded within the computer mouse.

In certain embodiments, a computer mouse comprises a rotary input control having a wheel and an electropermanent magnet (EPM) assembly, where the EPM assembly includes: two or more permanent magnets; and a magnetizing assembly configured to control a polarization of each of the two or more permanent magnets via an electrical current to transition the electropermanent magnet assembly between a plurality of operating states in which the EPM assembly is operable to apply any of a plurality of resistance profiles to the wheel based on how each of the two or more permanent magnets are polarized by the magnetizing assembly, where the magnetizing assembly is operable to polarize each of the two or more permanent magnets such that each of the two or more permanent magnets either emits or does not emit a magnetic field. In some aspects, the electropermanent magnet assembly further comprises magnetically conductive members positioned at opposing ends of the electropermanent magnet assembly, each magnetically conductive member comprising a respective plurality of teeth protruding radially toward the wheel, where each of the magnetically conductive members comprises a respective magnetic pole having a particular magnitude depending on a polarized state of the EPM assembly.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which.

DETAILED DESCRIPTION

Figure 1:
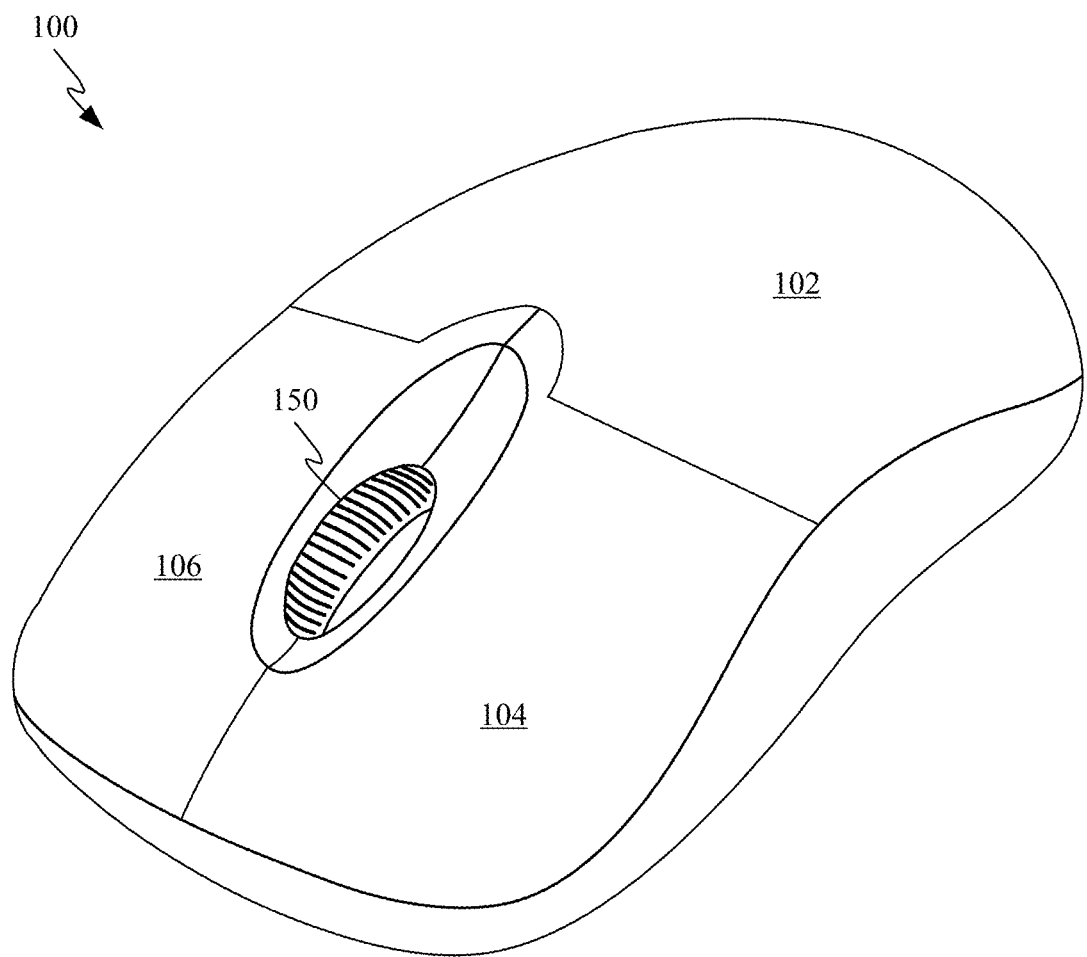
FIG. 1 shows an exemplary user input device suitable for use with the described embodiments and taking the form of a wireless mouse.

While certain embodiments are described, these embodiments are presented by way of example only, and are not intended to limit the scope of protection. The apparatuses and systems described herein may be embodied in a variety of other forms. Furthermore, various omissions, substitutions, and changes in the form of the example methods and systems described herein may be made without departing from the scope of protection.

A peripheral input device used as an interface between a user and a computer device can include a rotary input control as a physical element. The user may rotate the input control to cause a corresponding command to be sent to the computer device. An example of such an input control is a scroll wheel that can be located between the left and right buttons on top of a peripheral input device. Scroll wheels can be used to pan a field of view of a computer display. For example, a scroll wheel can be used by a user to scroll through a view of a document displayed on a computer screen. Other possible controls are compatible with the described embodiments that can include, e.g., a rotary dial or rotary encoder. However, for the purpose of simplicity examples of a scroll wheel will be used, but this should not limit the contemplated scope of the described embodiments.

A scroll wheel may have different modes of operation. For example, one mode of operation can be a free-wheeling mode wherein the scroll wheel can be rotated around an axis with a relatively constant and low coefficient of friction (which can be referred to as a first friction profile). Using such a mode, a user can swiftly pan their view over a document with a single finger movement to rotate the wheel. Another mode can be a ratcheted mode wherein the scroll wheel encounters periodic segments of relatively high friction with lower friction segments between (which can be referred to as a friction profile different from the first friction profile). Such a mode can allow a user to have greater control when panning through a document as a single finger movement to rotate the wheel may result in a metered panning of a view.

Some peripheral input devices allow a user to selectively enable a different friction profile for application to a scroll wheel to change the behavior of the scroll wheel according to a corresponding computer application, intended use, or user preference, for example. Different mechanisms are disclosed that can be used to change the friction profile applied to a wheel of a peripheral input device. Each of the mechanisms provide different power usage, noise, user feel, and actuation time characteristics. In some embodiments, the friction profile can be changed in accordance with parameters provided by an active application. For example, the friction profile could increase sharply to signify a brief pause/stop to scrolling to emphasize a particular feature. Additional force applied to overcome the increased friction profile can allow scrolling to continue and could in certain instances initiate a change back to the initial friction profile.

These and other embodiments are discussed below with reference to FIGS. 2-9 however, those skilled in the art will readily appreciate that the detailed description given herein with respect to these figures is for explanatory purposes only and should not be construed as limiting.

FIG. 1 shows an exemplary user input device 100 suitable for use with the described embodiments and taking the form of a wireless mouse. Wireless mouse 100 includes a housing 102 and input buttons 102 and 104. Positioned between input buttons 102 and 104 is a rotary input control 150 taking the form of a scrolling wheel (also referred to as a "wheel"). Rotary input control 150 can include a mechanism that can be used to implement a ratcheting friction profile for rotation of rotary input control 150. The mechanism can include an electropermanent magnetic ("EPM") actuator for changing a friction profile associated with rotation of rotary input control 150 as further described in the embodiments that follow.

Figure 2A:
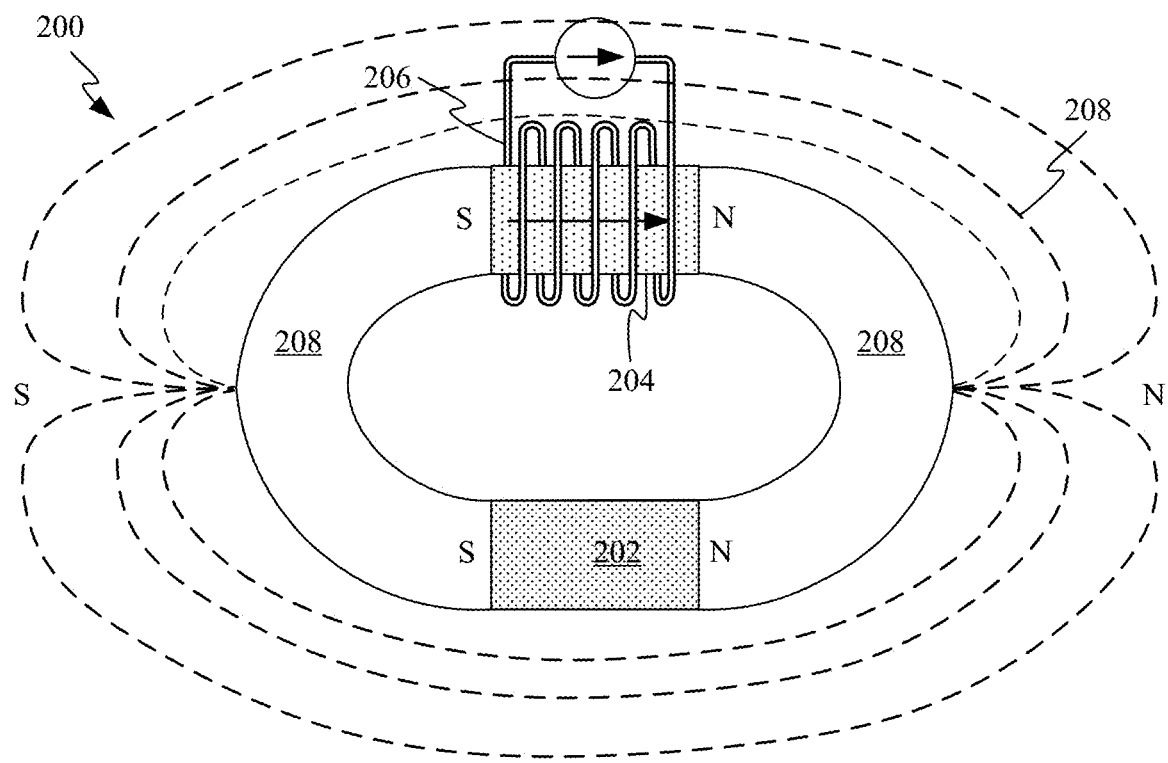
FIG. 2A shows an exemplary electropermanent magnet with dashed lines depicting a magnetic flux emitted by electropermanent magnet that show how with both first and second permanent magnets oriented in the same direction, magnetic flux is released from the electropermanent magnet to create well defined north and south poles, according to certain embodiments.
Figure 2B:
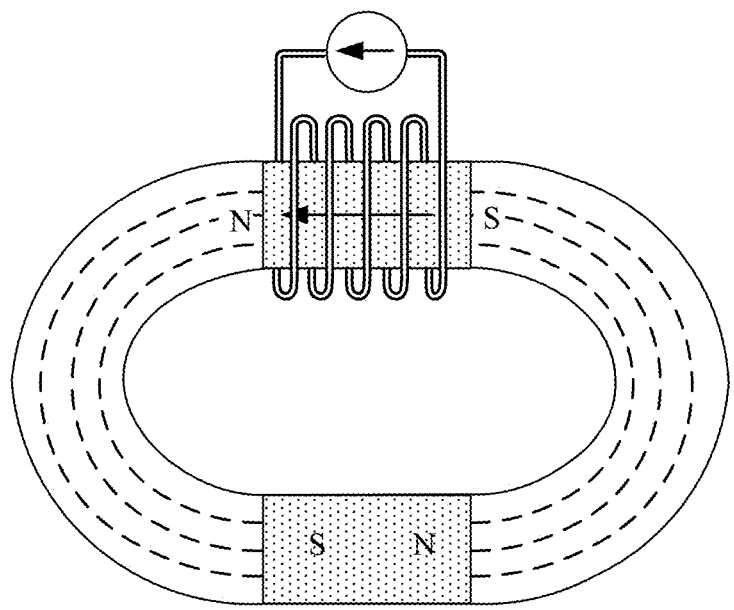
FIG. 2B shows how when the polarity of first permanent magnet is opposite the polarity of second permanent magnet, the magnetic flux generated by both permanent magnets remains substantially contained within and circulating through ferromagnetic poles, the first permanent magnet and the second permanent magnet, according to certain embodiments.

FIGS. 2A-2B show an exemplary electropermanent magnet 200. In particular, electropermanent magnet 200 includes a first permanent magnet 202 and a second permanent magnet 204. First permanent magnet 202 can have a higher intrinsic coercivity than second permanent magnet 204. In some embodiments, permanent magnet 202 can take the form of a rare earth (e.g., Neodymium Iron Boron or Samarium Cobalt) magnet and second permanent magnet 204 can take the form of a Ferromagnetic (e.g., Alnico or ferrite) magnet. The lower intrinsic coercivity of second permanent magnet 204 allows for a magnetizing coil 206 to emit a magnetic field of sufficient strength to reverse a polarity of the magnetic field emitted by second permanent magnet 204 without affecting the magnetization of first permanent magnet 202. For example, in some embodiments, an intrinsic coercivity of first permanent magnet 202 can be over ten times greater than an intrinsic coercivity of second permanent magnet 204. The lower intrinsic coercivity of second permanent magnet 204 also reduces the amount of electrical energy expended to flip the polarity of second permanent magnet 204, thereby allowing for more efficient operation of electropermanent magnet 200. First permanent magnet 202 and second permanent magnet 204 are each positioned between and in direct contact or at least close contact with ferromagnetic poles 208. Ferromagnetic poles 208 can be formed from a ferritic material such as mild steel, having an even lower intrinsic coercivity than second permanent magnet 204. Ferromagnetic poles 208 helps guide the magnetic fields emitted by first permanent magnet 202 and second permanent magnet 204. In some embodiments a size and shape of ferromagnetic poles 208 can be adjusted to produce a magnetic field having a desired size and shape.

FIG. 2A shows dashed lines 208 depicting a magnetic flux emitted by electropermanent magnet 200 that show how with both first and second permanent magnets 202 and 204 oriented in the same direction, magnetic flux is released from electropermanent magnet 200 to create well defined north and south poles. This magnetic field is symmetrical, as depicted, when the strengths of the magnetic fields emitted by the two permanent magnets are about the same.

FIG. 2B shows how when the polarity of first permanent magnet 202 is opposite the polarity of second permanent magnet 204, the magnetic flux generated by both permanent magnets remains substantially contained within and circulating through ferromagnetic poles 208, first permanent magnet 202 and second permanent magnet 204. This results in electropermanent magnet 200 emitting little to no magnetic field. These principles can be applied to the embodiments that follow in FIGS. 3A-7.

Figure 3A:
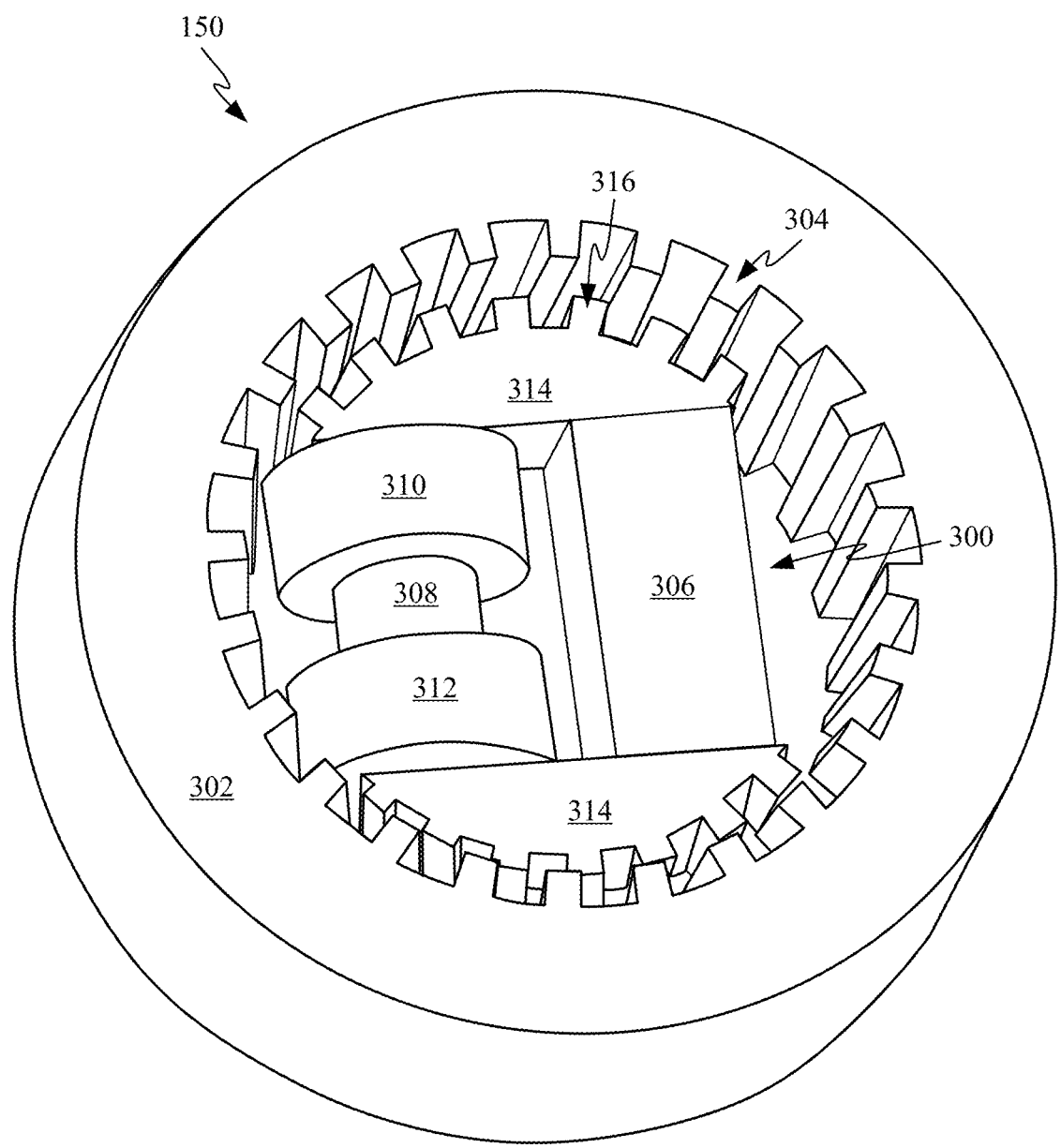
FIG. 3A shows a perspective view of an exemplary implementation in which an electropermanent magnet is configured to alter a resistance profile of a rotary input control compatible with the device depicted in FIG. 1, according to certain embodiments.

FIG. 3A shows a perspective view of an exemplary implementation in which an electropermanent magnet is configured to alter a resistance profile of a rotary input control 150 compatible with the device depicted in FIG. 1. The electropermanent magnet 300 is disposed within a central opening defined by ferromagnetic wheel 302. Ferromagnetic wheel 302 includes multiple teeth 304 protruding into the central opening and toward electropermanent magnet 300. Electropermanent magnet 300 includes a first permanent magnet 306 and a second permanent magnet 308. Magnetizing coils 310 and 312 are configured to reverse a polarity of the magnetic field emitted by second permanent magnet 308 in order to change a resistance profile of rotary input control 150. Ferromagnetic poles 314 each includes radially protruding teeth 316 that are spaced at the same interval as teeth 304 of ferromagnetic wheel 302. Radially protruding teeth 316 concentrate the magnetic field emitted by electropermanent magnet 300 so that rotation of ferromagnetic wheel 302 generates a resistance profile that provides a user with a varying amount of resistance, where the variation in resistance occurs at a rate that corresponds to a speed at which ferromagnetic wheel 302 is rotating. The variation in resistance is caused by interaction between the magnetic field emitted by electropermanent magnet 300 and ferromagnetic materials within the teeth of ferromagnetic wheel 302. Note that reference is made throughout this disclosure to "poles," which can include the two ends of a magnet, or at the ends of a magnetically conductive structure coupled to the end of a magnet pole, which effectively places the magnetic poles at the end magnetically conductive structure. For example, in FIG. 4A there are ferromagnetic poles 314, which are magnetically conductive members coupled to the magnets themselves. In operation, magnetic lines of flux emanate from said magnetically conductive members rather than from the end of the magnets (as they conduct the magnetic field) and magnetically interact with teeth 304 of wheel 302, as further described below and as would be appreciated by one of ordinary skill in the art with the benefit of this disclosure.

Figure 3B:
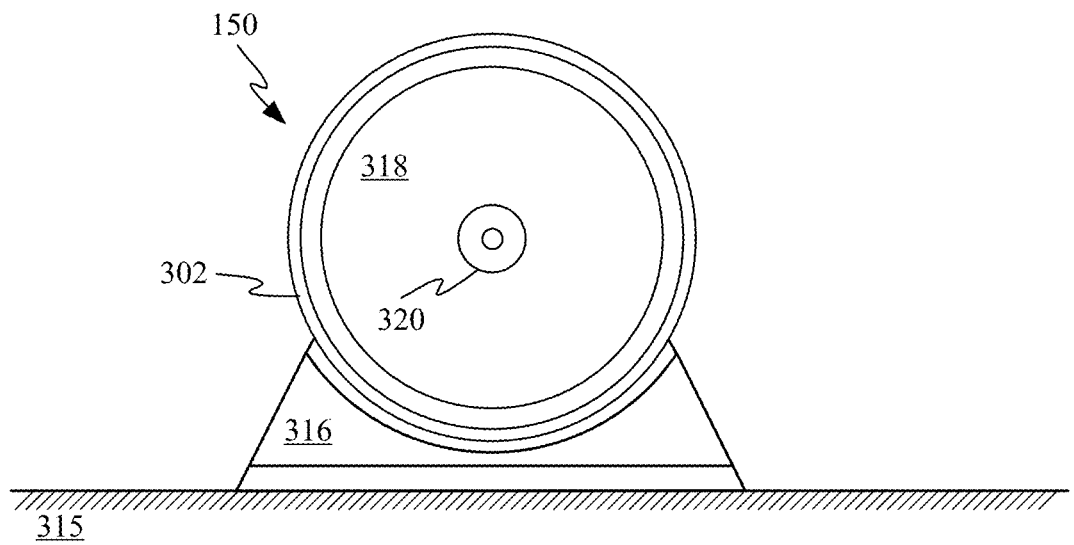
FIG. 3B shows a side view of rotary input control elevated above a support surface by a support structure, according to certain embodiments.
Figure 3C:
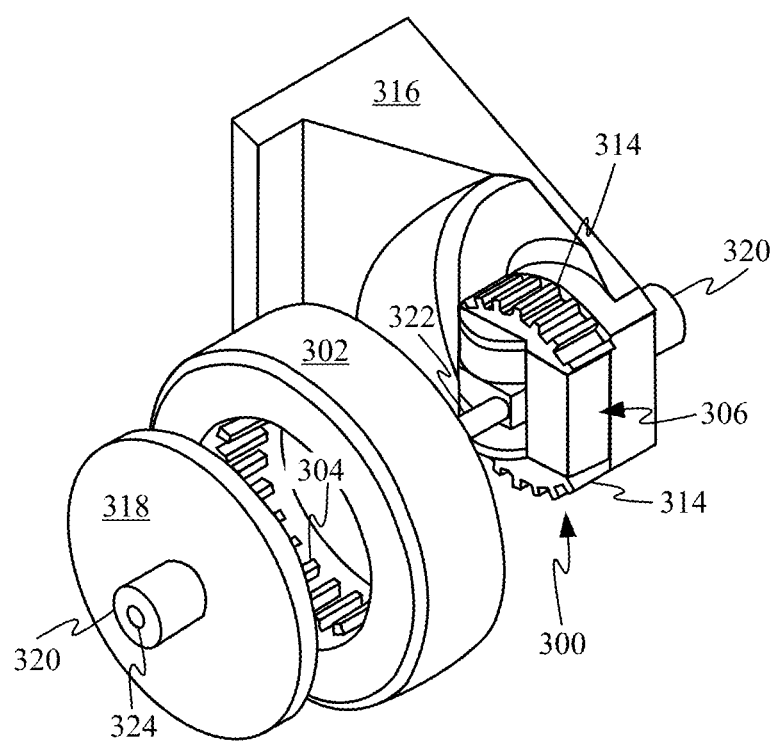
FIG. 3C shows an exploded view of rotary input control and support structure, according to certain embodiments.

FIGS. 3B-3C show a support structure for rotary input control 150. FIG. 3B shows a side view of rotary input control 150 elevated above a support surface 315 by a support structure 316. The central opening of ferromagnetic wheel 302 is covered by a non-magnetic bearing assembly 318 that includes a self-lubricated axle 320 that can be configured to stabilize ferromagnetic wheel 302 during use by engaging a bearing of housing 102 (not depicted). In some embodiments, support surface 315 can take the form of a wall of an input device housing, such as housing 102 as depicted in FIG. 1. In some embodiments, support structure 316 can integrated or incorporated into the wall of the input device housing.

FIG. 3C shows an exploded view of rotary input control 150 and support structure 316. In particular, teeth 304 do not extend axially through the central opening defined by ferromagnetic wheel 302 but instead leave space for a portion of bearing assembly 318 to engage ferromagnetic wheel 302 by an interference fit. The interference fit provides a simple way for bearing assembly 318 to be axially aligned with ferromagnetic wheel 302. Alternatively, ferromagnetic wheel 302 could also be adhesively coupled to one side of ferromagnetic wheel 302. FIG. 3C also shows how electropermanent magnet 300 can be coupled to support structure 316 as well as how a shaft 322 extends through a central region of electropermanent magnet 300. In particular, shaft 322 can extend between first permanent magnet 306 and second permanent magnet 308. Shaft 322 engages an opening defined by self-lubricated axle 320 to couple ferromagnetic wheel 302 to support structure 316. It should be noted that in some embodiments, bearing assembly 318 and support structure 316 can both be constructed of polymer material to avoid any unwanted interference with electropermanent magnet 300.

Figure 4A:
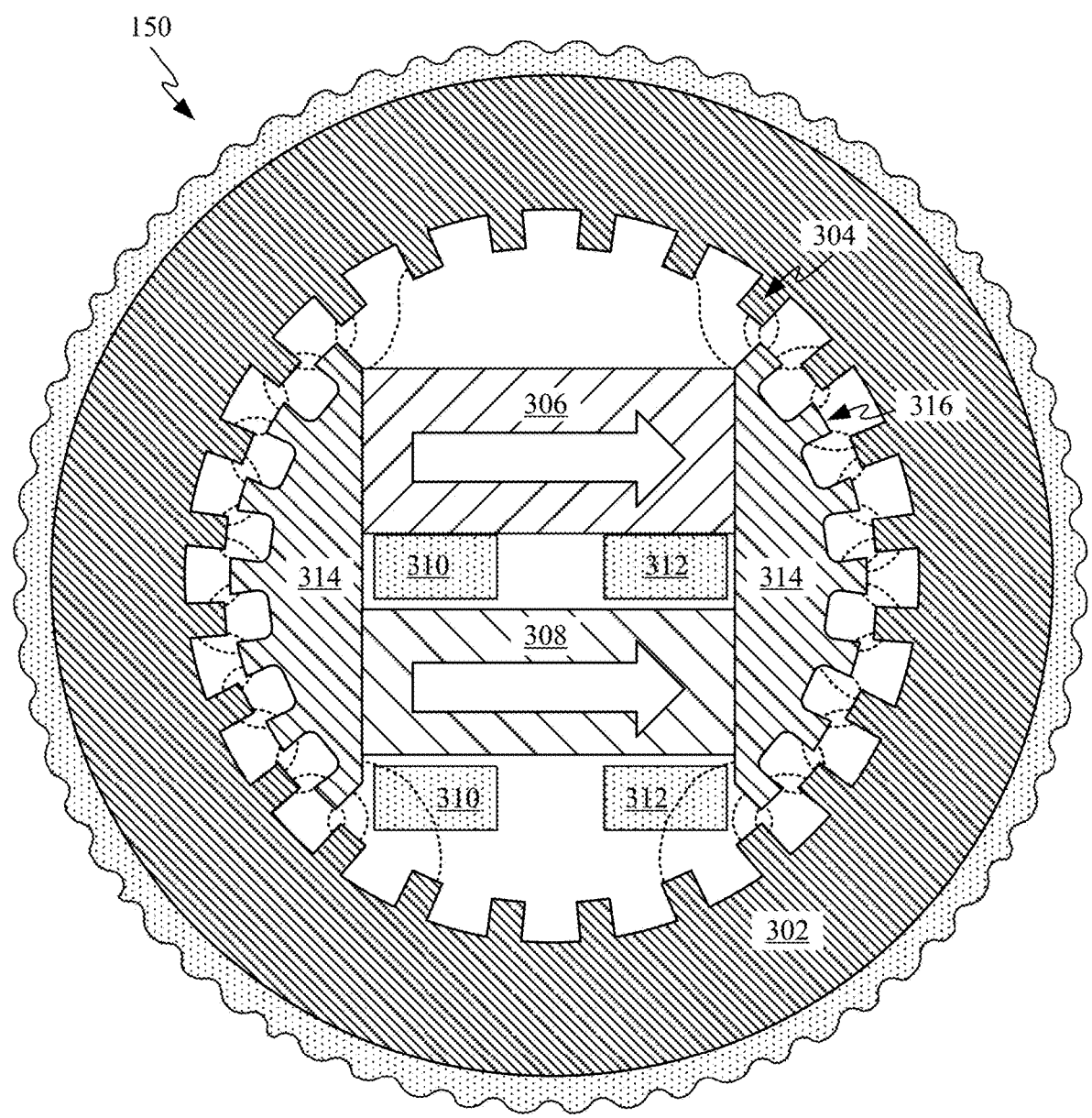
FIG. 4A shows a cross-sectional view of a rotary input control in which a polarity of the magnetic fields emitted by permanent magnets are oriented in the same direction and how a magnetic flux emitted from radially protruding teeth from the EPM assembly interacts with the ferromagnetic material making up teeth on the wheel when they are offset (not aligned), according to certain embodiments.
Figure 4B:
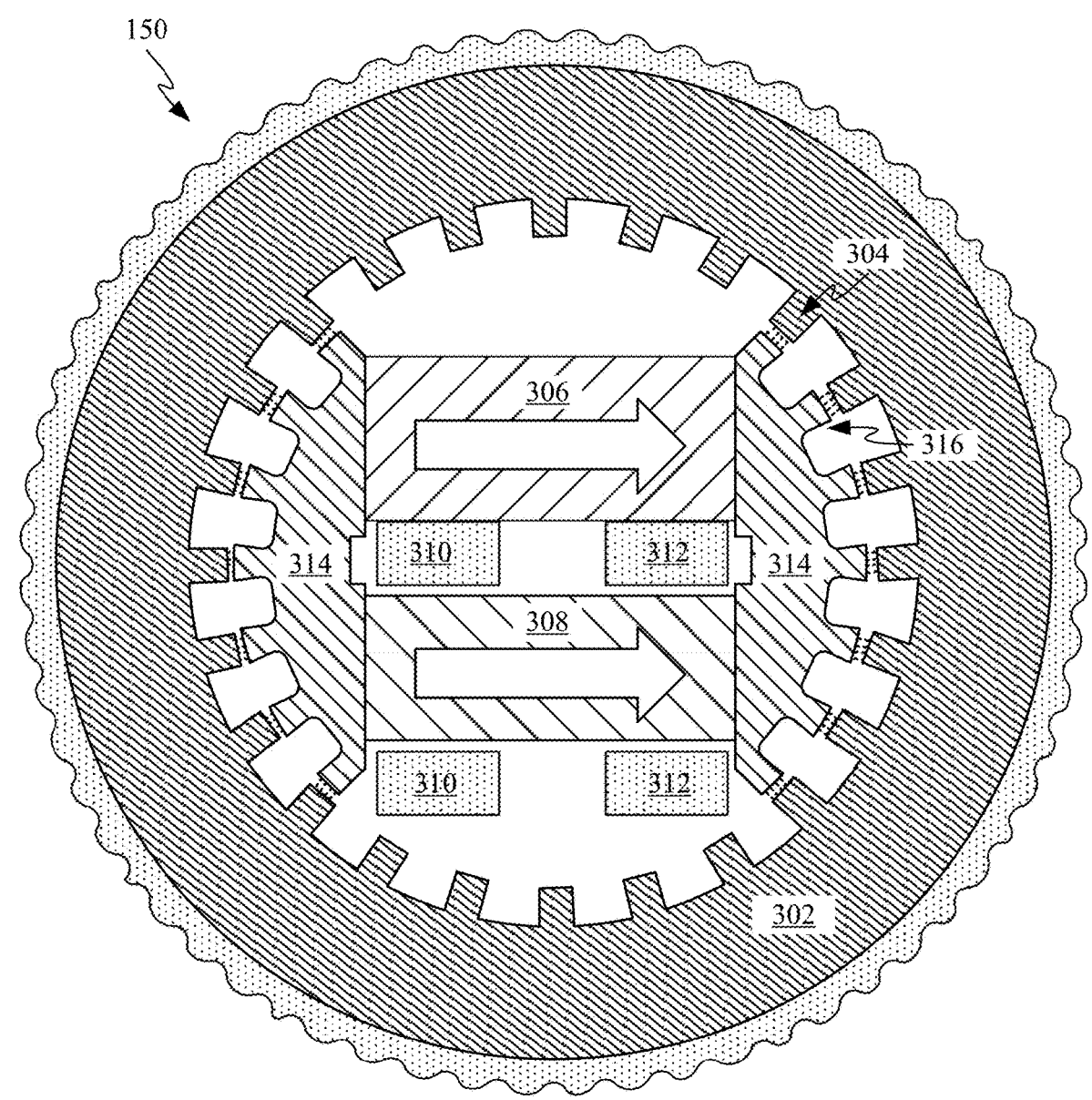
FIG. 4B shows a cross-sectional view of a rotary input control in which a polarity of the magnetic fields emitted by permanent magnets are oriented in the same direction when the radially protruding teeth are aligned with a respective one of the teeth on the wheel, according to certain embodiments.

FIGS. 4A-4B show cross sectional views of rotary input control 150 in which a polarity of the magnetic fields emitted by permanent magnets 306 and 308 are oriented in the same direction. FIG. 4A shows how a magnetic flux emitted from radially protruding teeth 316 interacts with the ferromagnetic material making up teeth 304. In the depicted position, each of teeth 304 are positioned between two adjacent radially protruding teeth 304, which results in a resistance to rotation of ferromagnetic wheel 302 in either direction being low. That is, FIG. 4A shows protruding teeth 316 configured at their farthest position with respect to teeth 304 making for a weaker magnetic coupling and consequently provides less resistance to rotation of rotary input control 150. However, when radially protruding teeth 316 are aligned with a respective one of teeth 304, as shown in FIG. 4B, rotation of ferromagnetic wheel 302 becomes more difficult due to rotation in either direction moving teeth 304 farther away from a respective one of radially protruding teeth 316. That is, FIG. 4B shows protruding teeth 316 configured at their closest position with respect to teeth 304 making for a stronger magnetic coupling and consequently provides more resistance to rotation of rotary input control 150. In this way, a resistance profile can provide a ratcheting feedback to a user without the need for any movement of electropermanent magnet 300. In some embodiments, ferromagnetic wheel can include a tactile ribbed layer that improves a grip of a user's finger on rotary input control 150.

Figure 4C:
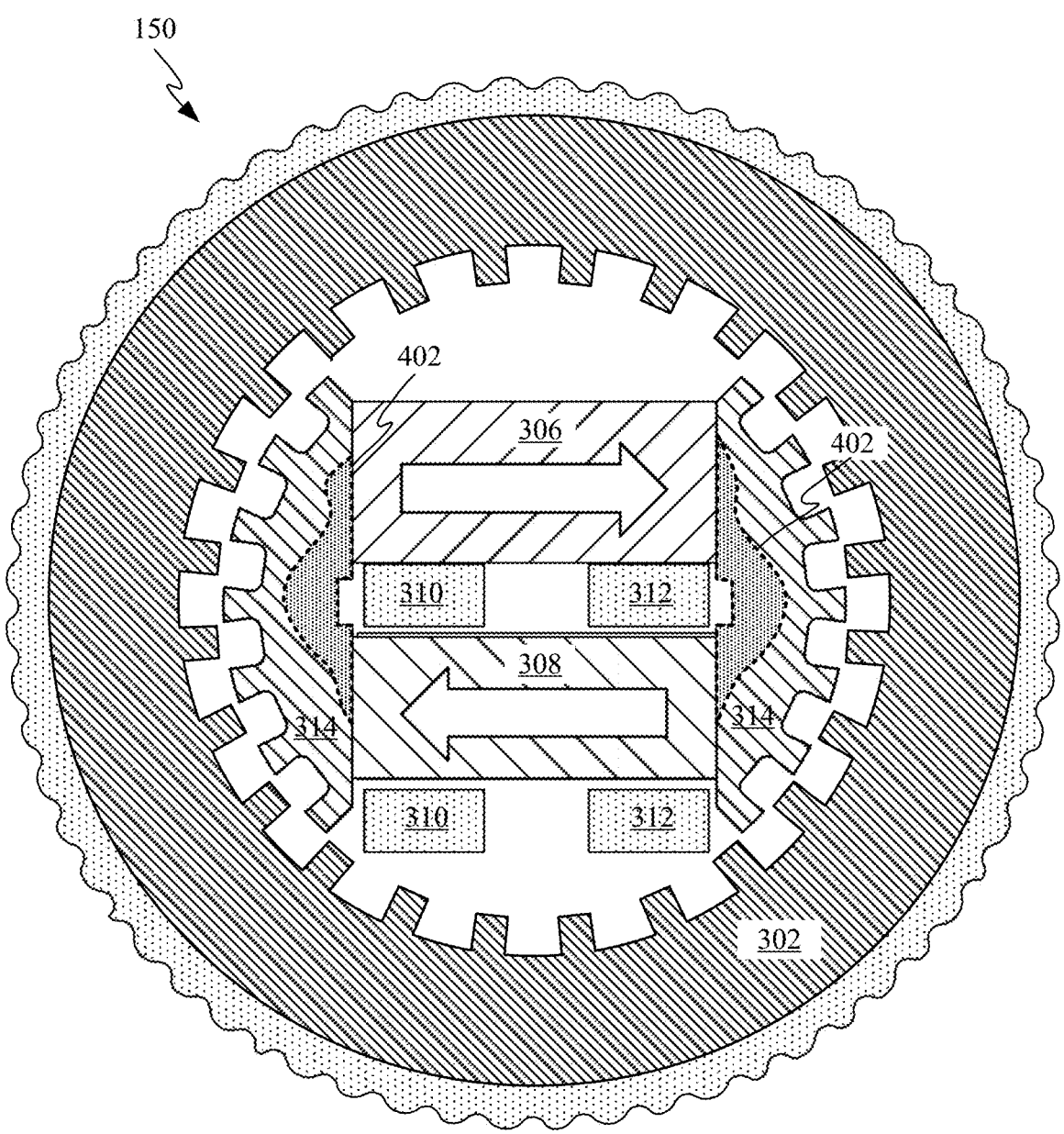
FIG. 4C shows another cross-sectional view of a rotary input control in which a polarity of a permanent magnet has been reversed, according to certain embodiments.

FIG. 4C shows another cross-sectional view of rotary input control 150 in which a polarity of permanent magnet 308 has been reversed. This results in the magnetic flux 402 being contained within ferromagnetic poles 314 since the polarity of the permanent magnets allows magnetic flux 402 to circulate within the magnetic circuit defined by permanent magnets 306/308 and ferromagnetic poles 314. This results in there being little to no interaction between electropermanent magnet 300 and ferromagnetic wheel 302, which allows a user to experience no tactile feedback during rotation of rotary input control 150. In practice, this may feel like a constant low friction resistance profile (e.g., a "free wheel" mode of operation).

In some embodiments, multiple coils may be used to incorporate more than two modes of operation, which is typically an "on" state where there is magnet-induced rotational friction, as shown in FIGS. 4A-4B, and an "off" state where there is little to no magnet-induced rotation friction, as shown in FIG. 4C. For example, two or more EPMs can each individually be turned "on" (fully energized; current flow) or "off" (fully de-energized; no current flow) in a number of different combinations to achieve varying amounts of magnetic coupling between protruding teeth 316 and teeth 304. The two or more EPMS can be co-located, configured in series, configured in parallel, configured in series-parallel, or other suitable configuration.

Figure 5A:
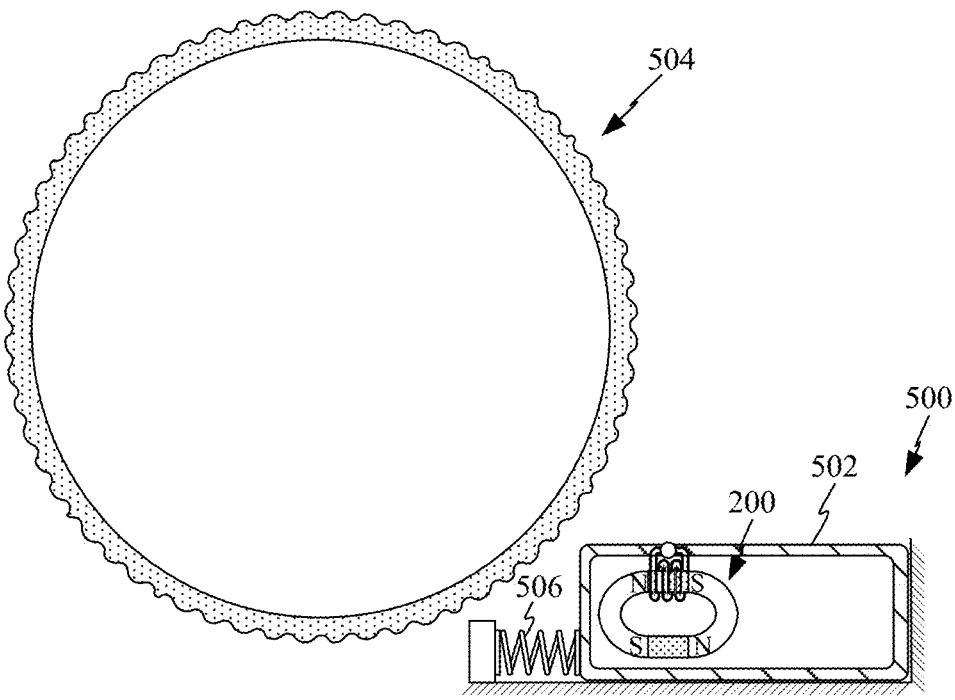
FIG. 5A shows a side view of an electropermanent magnet assembly for changing a resistance profile of a rotary input control, according to certain embodiments.

FIG. 5A shows a side view of an electropermanent magnet assembly 500 for changing a resistance profile of a rotary input control. In particular, electropermanent magnet assembly 500 includes an electropermanent magnet 200 disposed within a housing 502 formed from magnetically neutral materials such as polymer or ceramic based materials. Electropermanent magnet 200 can be similar to or the same as the previously described electropermanent magnet 200 described in FIG. 2A-2B and is depicted in a first state in which little to no magnetic field is emitted from electropermanent magnet 200. Housing 502 can be positioned upon a supporting surface and biased away from wheel 504 by biasing mechanism 506. Biasing mechanism 506 can be configured to prevent housing 502 from contacting wheel 504 while electropermanent magnet 200 is in the first state where electropermanent magnet 200 is not emitting a magnetic field.

Figure 5B:
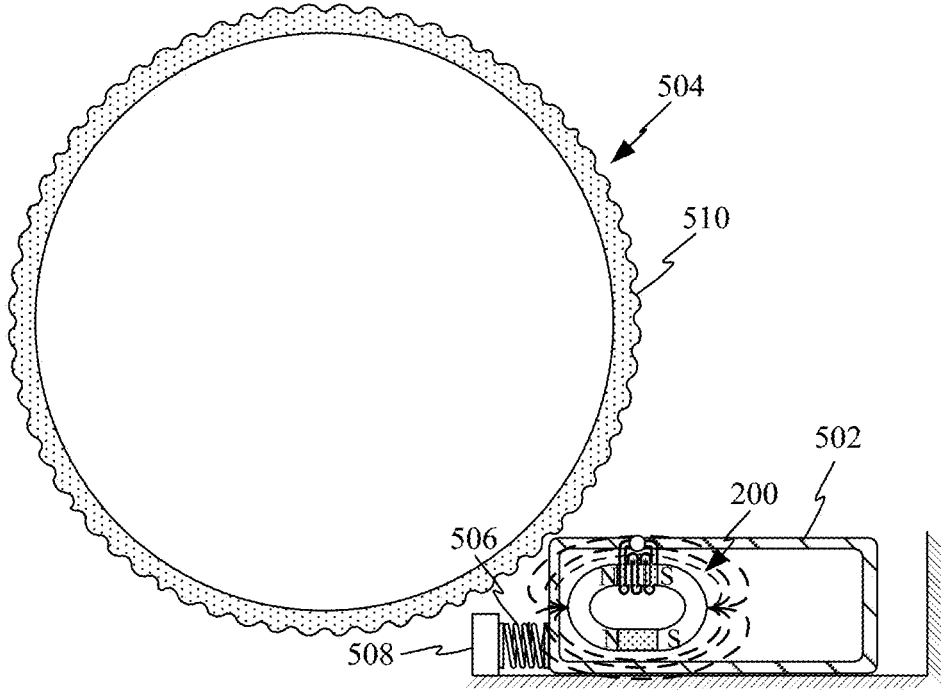
FIG. 5B shows how when a electropermanent magnet is in a second state a magnetic field emitted from the electropermanent magnet extends through one or more walls of the housing, according to certain embodiments.

FIG. 5B shows how when electropermanent magnet 200 is in a second state a magnetic field emitted from electropermanent magnet 200 extends through one or more walls of housing 502. The magnetic field is then able to interact with magnetically attractable materials incorporated within wheel 504 and/or support structure 508 associated with biasing mechanism 506 and generate a force that overcomes the force applied by biasing mechanism 506 to push a corner of housing 502 into at least periodic contact with wheel 504. Wheel 504 includes an irregular or rigid exterior surface that interacts with the corner of housing 502 to provide ratcheting feedback to a user during rotation of wheel 504. It should be appreciated that by increasing or decreasing the strength of the field emitted by electropermanent magnet 200 a resistance profile associated with wheel 504 can be fine-tuned or changed in order to suit a given circumstance. For example, for some embodiments, it can be beneficial to configure electropermanent magnet 200 to press the corner of housing 502 into wheel 504 to such an extent that wheel 504 is completely prevented from moving.

Figure 6:
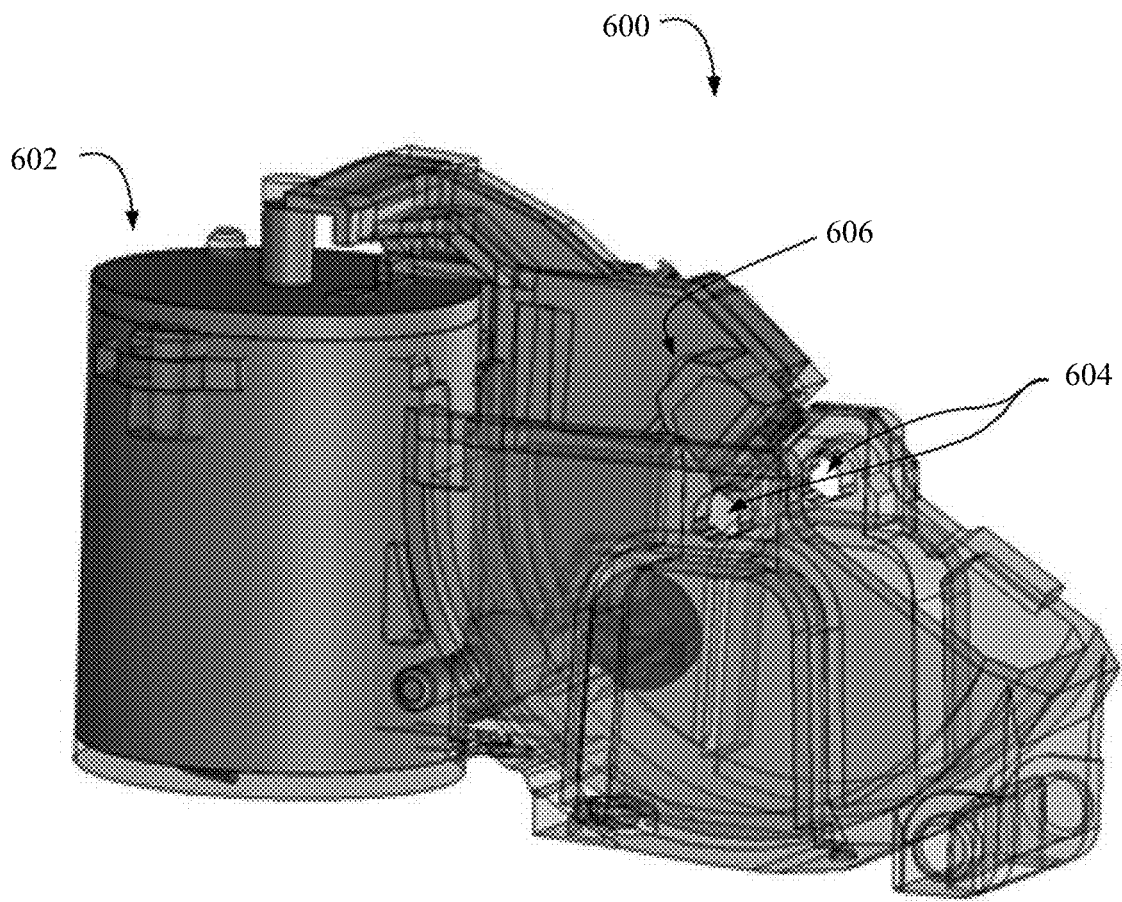
FIG. 6 illustrates a mechanism that can be used to move a ball to selectively alter a mode of rotation of a scroll wheel, according to certain embodiments.

FIG. 6 illustrates a mechanism 600 that can be used to move ball 606 to selectively alter a mode of rotation of wheel 150. By selectively altering the mode of rotation, a different friction profile can be applied to wheel 150. Mechanism 600 includes a linear actuator 602. Linear actuator 602 can be used to move ball 606 between two or more positions. Note that wheel 150 is not shown, but cutouts 604 are labeled where axis 102 can be located. If linear actuator 602 is bistable, then linear actuator 602 can substantially maintain its position between two positions without application of an electric signal. An electric signal can be applied to linear actuator 602 to change position of ball 606. Linear actuator 602 can be an electromagnetic device wherein an applied electric signal is transformed into a magnetic field to change position of ball 606. Linear actuator 602 may or may not include mechanical stoppers to limit the range of motion of ball 606. Lacking mechanical stoppers and instead relying on magnetic stoppers, for example, can reduce noise when actuating between positions. In some embodiments, magnetic stoppers may incorporate EPM implementations as described in the various embodiments above.

Figure 7:
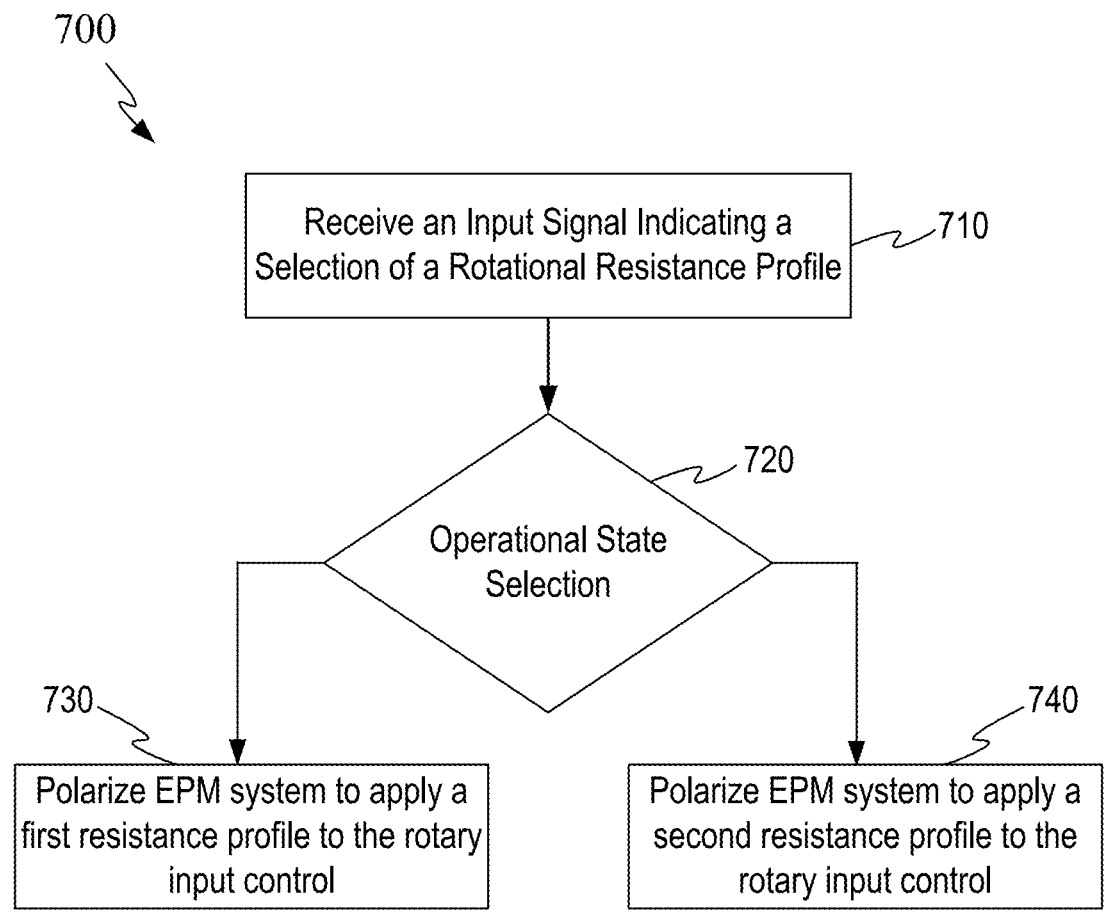
FIG. 7 is a simplified flow chart showing aspects of a method for changing a rotational resistance profile for a rotary input control on a user input device, according to certain embodiments.

FIG. 7 is a simplified flow chart showing aspects of a method 700 for changing a rotational resistance profile for a rotary input control on a user input device, according to certain embodiments. Method 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by aspects of any of processor(s) 802, 910, or a combination thereof the systems thereof.

At operation 710, method 700 can include receiving an input signal indicating a selection of one of a plurality of rotational resistance profiles for the rotary input control that includes a first operational state and a second operational state, according to certain embodiments.

At operation 720, in response to the received input signal corresponding to the selection of the first operational state, method 700 can include causing a magnetizing system to electromagnetically control a magnetic polarization of a permanent magnet of an electropermanent magnet (EPM) system to apply a first resistance profile to the rotary input control (operation 730).

Alternatively at operation 720, in response to the received input signal corresponding to the selection of the second operational state, method 700 can include causing the magnetizing system to electromagnetically control the magnetic polarization of a permanent magnet of an electropermanent magnet (EPM) assembly to apply a second resistance profile to the rotary input control (operation 730). In some aspects, the electropermanent magnet assembly further comprises magnetically conductive members positioned at opposing ends of the electropermanent magnet, each magnetically conductive member comprising a respective plurality of teeth protruding radially toward the rotary input control, and each of the magnetically conductive members comprises a respective magnetic pole depending on a polarized state of the EPM assembly. In some cases, the rotary input control can define a central opening within which the electropermanent magnet assembly is disposed and wherein the rotary input control includes a second plurality of teeth protruding from the rotary input control and toward the EPM assembly, as shown but not limited to, for example, in FIGS. 3A and 4A-4C.

In some embodiments, the first resistance profile can be a ratcheting resistance profile generated by a magnetic flux emitted by the permanent magnet that flows through the plurality of teeth of the magnetically conductive members to interact with corresponding ones of the second plurality of teeth protruding from the rotary input control. The permanent magnet may be a first permanent magnet and the electropermanent magnet assembly further comprises a second permanent magnet, the first and second permanent magnets being aligned and cooperating with the magnetically conductive members to form a magnetic circuit. In some cases, the EPM assembly may further comprise a shaft that couples the electropermanent magnet assembly to the rotary input control enabling the rotary input control to rotate with respect to the EPM assembly. The first resistance profile may apply a free-wheeling force to the wheel and the second resistance profile applies a ratcheting force to the wheel. In certain embodiments, the first resistance profile may be applied by interaction between a magnetic field emitted by the electropermanent magnet assembly and magnetically attractable materials of the wheel. In some aspects, the user input device can be a computer mouse and the wheel can be a scroll wheel embedded within the computer mouse.

It should be appreciated that the specific steps illustrated in FIG. 7 provide a particular method 700 for changing a rotational resistance profile for a rotary input control on a user input device, according to certain embodiments. Other sequences of steps may also be performed according to alternative embodiments. Furthermore, additional steps may be added or removed depending on the particular applications. In some aspects, more or fewer EPMs can be used, as described in the manner above. Any combination of changes can be used and one of ordinary skill in the art with the benefit of this disclosure would understand the many variations, modifications, and alternative embodiments thereof.

Figure 8:
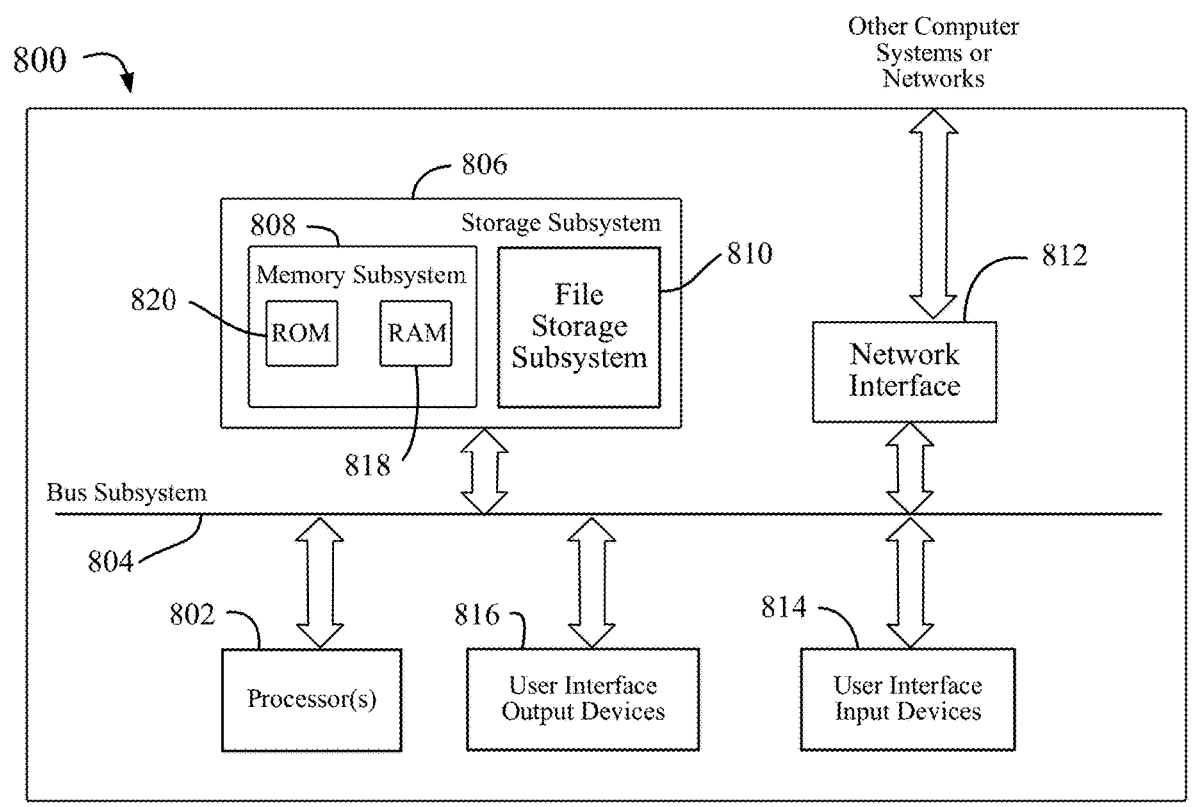
FIG. 8 illustrate a system for implementing certain features of peripheral devices disclosed herein.

FIG. 8 shows a system 800 for operating a host computing device (e.g., host computing device 810), according to certain embodiments. System 800 can be used to implement any of the host computing devices or peripheral interface devices discussed herein and the myriad embodiments defined herein or within the purview of this disclosure but not necessarily explicitly described. System 800 can include one or more processors 802 that can communicate with a number of peripheral devices (e.g., input devices) via a bus subsystem 804. These peripheral devices can include storage subsystem 806 (comprising memory subsystem 808 and file storage subsystem 810), user interface input devices 814, user interface output devices 816, and network interface subsystem 812. User input devices 814 can be any of the input device types described herein (e.g., keyboard, computer mouse, remote control, etc.). User output devices 816 can be a display of any type, including computer monitors, displays on handheld devices (e.g., smart phones, gaming systems), or the like, as would be understood by one of ordinary skill in the art. Alternatively or additionally, a display may include virtual reality (VR) displays, augmented reality displays, holographic displays, and the like, as would be understood by one of ordinary skill in the art.

In some examples, internal bus subsystem 804 can provide a mechanism for letting the various components and subsystems of computer system 800 communicate with each other as intended. Although internal bus subsystem 804 is shown schematically as a single bus, alternative embodiments of the bus subsystem can utilize multiple buses. Additionally, network interface subsystem 812 can serve as an interface for communicating data between computer system 800 and other computer systems or networks. Embodiments of network interface subsystem 812 can include wired interfaces (e.g., Ethernet, CAN, RS232, RS485, etc.) or wireless interfaces (e.g., Bluetooth®, BLE, ZigBee®, Z-Wire®, Wi-Fi, cellular protocols, etc.).

In some cases, user interface input devices 814 can include a keyboard, a presenter, a pointing device (e.g., mouse, trackball, touchpad, etc.), a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 800. Additionally, user interface output devices 816 can include a display subsystem, a printer, or non-visual displays such as audio output devices, etc. The display subsystem can be any known type of display device. In general, use of the term "output device" is intended to include all possible types of devices and mechanisms for outputting information from computer system 800.

Storage subsystem 806 can include memory subsystem 808 and file storage subsystem 810. Memory subsystems 808 and file storage subsystem 810 represent non-transitory computer-readable storage media that can store program code and/or data that provide the functionality of embodiments of the present disclosure. In some embodiments, memory subsystem 808 can include a number of memories including main random access memory (RAM) 818 for storage of instructions and data during program execution and read-only memory (ROM) 820 in which fixed instructions may be stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and not intended to limit embodiments of the present disclosure. Many other configurations having more or fewer components than system 800 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Figure 9:
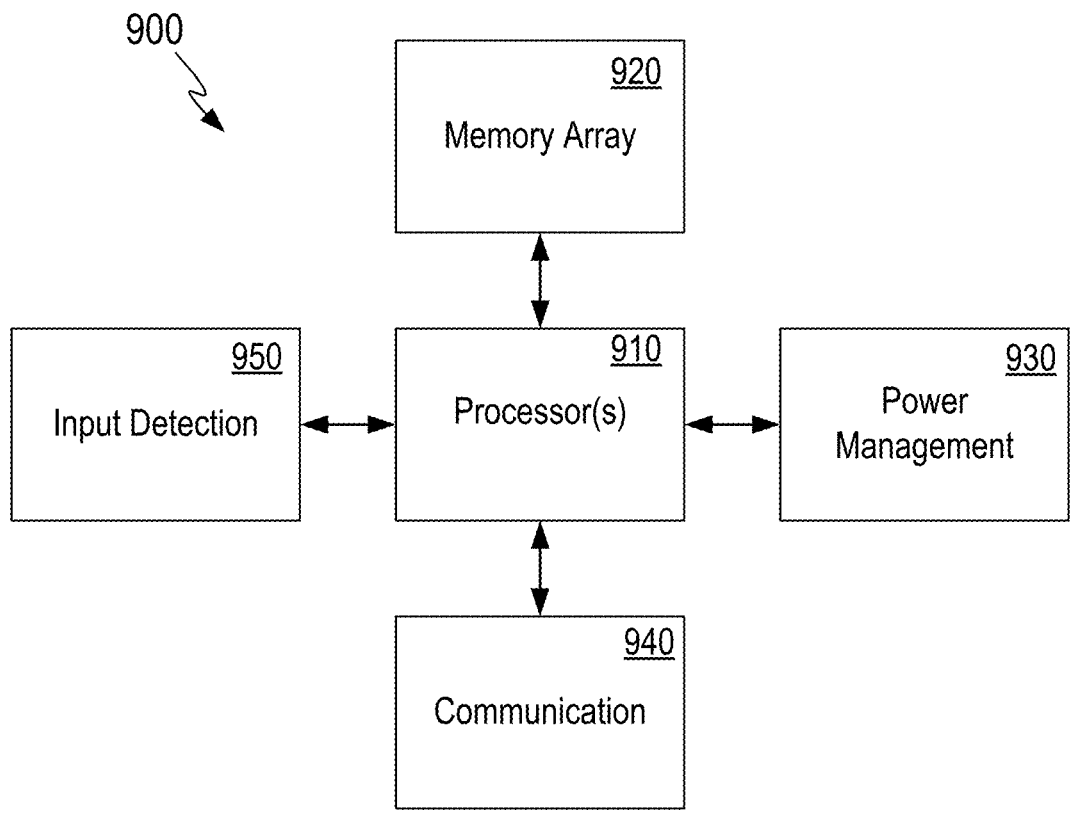
FIG. 9 shows another representation of a system for operating a peripheral device (e.g., a user input device such as a computer mouse), according to certain embodiments.

FIG. 9 shows a system 900 for operating a peripheral device (e.g., user input device 100), according to certain embodiments. System 900 includes processor(s) 910, memory array 920, power management system 930, communication system 940, and input detection module 950. Each of the system blocks 920-950 can be in electrical communication with the processor(s) 910 (e.g., via a bus system). System 900 may further include additional systems that are not shown or discussed to prevent obfuscation of the novel features described herein. System blocks 920-950 may be implemented as separate modules, or alternatively, more than one system block may be implemented in a single module. Note that system 800 and system 900 provide examples of some typical systems that can be used to implement the various embodiments described here and any modifications, variations, and alternative implementations may be used, as would be appreciated by one of ordinary skill in the art with the benefit of this disclosure.

In certain embodiments, processor(s) 910 comprises one or more microprocessors (μCs) and can be configured to control the operation of system 900. Alternatively, processor(s) 910 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 910 can control some or all aspects of operation of user input device 100 (e.g., system block 920-950). Alternatively or additionally, some of system blocks 920-950 may include an additional dedicated processor, which may work in conjunction with processor 910. One of ordinary skill in the art would understand the many variations, modifications, and alternative embodiments thereof.

Memory array 920 may be configured to store information pertaining to one or more operational configurations of user input device 100. As further discussed below, one or more operational configurations of user input device 100 may include setting performance characteristics of user input device 100, including but not limited to, a computer mouse scroll speed, a sensitivity of computer mouse movement sensor, mapping of keyboard hot keys, microphone volume, etc., and the like. Memory array 920 may also store other configuration information used for communication with user input device 100, as further discussed below.

Additionally, memory array 920 can store one or more software programs to be executed by processors (e.g., in processor(s) 910). It should be understood that "software" can refer to sequences of instructions that, when executed by processing unit(s) (e.g., processors, processing devices, etc.), cause system 900 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. More germane to the present disclosure, memory array 920 (along with processor 910) may include instructions (realized via software, firmware, hardware, and in any combination thereof) configured to implement the various electropermanent magnet control schemes described herein. For example, processor(s) 910 and memory array 920 (and perhaps input detection 950) may work in conjunction with one another to detect a user input indicating a desired change in a resistance profile (e.g., a button press) which can then control a current flow through the EPM magnets to set said resistance profile accordingly, as further described above in greater detail, and as would be appreciated by one of ordinary skill in the art with the benefit of this disclosure.

Power management system 930 can be configured to manage power distribution, recharging, power efficiency, and the like, for user input device 100. In some embodiments, power management system 930 can include a battery (not shown), a USB based recharging system for the battery (not shown), and power management devices (e.g., low-dropout voltage regulators—not shown). In certain embodiments, the functions provided by power management system 930 may be incorporated into processor(s) 910. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communications system 940 can be configured to provide wireless and/or wired communication between processors 910 and one or more of user input device 100, according to some examples. Communications system 940 can be configured to provide radio-frequency (RF), Bluetooth®, BLE, WiFi, infra-red (IR), ZigBee®, Logitech Unifying®, or other suitable communication technology to communicate with other computing devices and/or peripheral devices. Communications system 940 may also provide hardwired connection with processors 910. The hardwired connection can include a serial interconnect such as, for example, Universal Serial Bus (USB), FireWire®, DisplayPort®, etc.

One example of communication system 940 can be a dongle, which can provide a combination of wireless and wired communication between processors 910 and one or more of user input device 100. For example, the dongle may include a wired connector interface (e.g., a USB connector) which can be plugged into a hardwire interface port (e.g., a USB port). The hardwire interface port, in turn, is connected to processors 910 via a hardwired interconnect (e.g., USB buses). Moreover, the dongle may also include a wireless interface (e.g., a Bluetooth® wireless interface) to perform wireless data transfer with user input device 100. The dongle can receive sensor data from user input device 100 via the wireless interface, and transmit the sensor data to processors 910 via the hardwired interconnect.

Input detection module 950 can control the detection of a user-interaction with input elements on user input device 100. For instance, input detection module 950 can detect user inputs based on sensor data from computer mouse 130. In some embodiments, input detection module 950 can work in conjunction with memory array 920 to generate input data to processors 910 based on the sensor data received from communication system 940. For example, based on scrolling speed information stored in memory array 920 as well as sensor data from computer mouse 130, input detection module 950 can calculate a distance traversed by a mouse pointer on display 120, and provide the distance information to processors 910 (or a renderer) to render the movement of the mouse on display 120.

Although certain systems may not expressly discussed, they should be considered as part of system 900, as would be understood by one of ordinary skill in the art. For example, system 900 may include a bus system to transfer power and/or data to and from the different systems therein.

It should be appreciated that system 900 is illustrative and that variations and modifications are possible. System 900 can have other capabilities not specifically described herein. Further, while system 900 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices implemented using any combination of circuitry and software. Furthermore, aspects and/or portions of system 900 may be combined with or operated by other sub-systems as required by design. For example, input detection module 950 and/or memory array 920 may operate within processor(s) 910 instead of functioning as a separate entity. In addition, the inventive concepts described herein can also be applied to various peripheral devices and not limited to computer mice, keyboards, or microphones. System 900 can be applied to any of the peripheral devices described in the embodiments herein, whether explicitly, referentially, or tacitly described (e.g., would have been known to be applicable to a particular peripheral device by one of ordinary skill in the art). The foregoing embodiments are not intended to be limiting and those of ordinary skill in the art with the benefit of this disclosure would appreciate the myriad applications and possibilities.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A user input device, comprising:
   a rotary input control, comprising:
      a wheel; and
      an electropermanent magnet (EPM) assembly, comprising:
         a permanent magnet; and
         a magnetizing assembly configured to control a polarization of the permanent magnet to transition the electropermanent magnet assembly from a first state in which the EPM assembly applies a first resistance profile to the wheel and a second state in which the EPM assembly applies a second resistance profile to the wheel; and,
         magnetically conductive members positioned at opposing ends of the electropermanent magnet, each magnetically conductive member comprising a respective plurality of teeth protruding radially toward the wheel, and wherein each of the magnetically conductive members comprises a respective magnetic pole depending on a polarized state of the EPM assembly.

2. The user input device as recited in claim 1 wherein the wheel defines a central opening within which the electropermanent magnet assembly is disposed and wherein the wheel comprises a second plurality of teeth protruding from the wheel and toward the EPM assembly.

3. The user input device as recited in claim 2 wherein the first resistance profile is a ratcheting resistance profile generated by a magnetic flux emitted by the permanent magnet that flows through the plurality of teeth of the magnetically conductive members to interact with corresponding ones of the second plurality of teeth protruding from the wheel.

4. The user input device as recited in claim 2 wherein the permanent magnet is a first permanent magnet and the electropermanent magnet assembly further comprises a second permanent magnet, the first and second permanent magnets being aligned and cooperating with the magnetically conductive members to form a magnetic circuit.

5. The user input device as recited in claim 4 further comprising a shaft that couples the electropermanent magnet assembly to the wheel enabling the wheel to rotate with respect to the electropermanent magnet assembly.

6. The user input device as recited in claim 1 wherein the first resistance profile applies a free-wheeling force to the wheel and the second resistance profile applies a ratcheting force to the wheel.

7. The user input device as recited in claim 1 wherein the first resistance profile is applied by interaction between a magnetic field emitted by the electropermanent magnet assembly and magnetically attractable materials of the wheel.

8. The user input device as recited in claim 1 wherein the user input device is a computer mouse and the wheel is a scroll wheel embedded within the computer mouse.

9. A method of changing a rotational resistance profile for a rotary input control on a user input device, the method comprising:
   receiving an input signal indicating a selection of one of a plurality of rotational resistance profiles for the rotary input control that includes a first operational state and a second operational state;
   in response to the received input signal corresponding to the selection of the first operational state, causing a magnetizing system to electromagnetically control a magnetic polarization of a permanent magnet of an electropermanent magnet (EPM) system to apply a first resistance profile to the rotary input control; and
   in response to the received input signal corresponding to the selection of the second operational state, causing the magnetizing system to electromagnetically control the magnetic polarization of a permanent magnet of an electropermanent magnet (EPM) assembly to apply a second resistance profile to the rotary input control; and,
   magnetically conductive members positioned at opposing ends of the electropermanent magnet, each magnetically conductive member comprising a respective plurality of teeth protruding radially toward the rotary input control, and wherein each of the magnetically conductive members comprises a respective magnetic pole depending on a polarized state of the EPM assembly.

10. The method of claim 9 wherein the rotary input control defines a central opening within which the electropermanent magnet assembly is disposed and wherein the rotary input control includes a second plurality of teeth protruding from the rotary input control and toward the EPM assembly.

11. The method of claim 10 wherein the first resistance profile is a ratcheting resistance profile generated by a magnetic flux emitted by the permanent magnet that flows through the plurality of teeth of the magnetically conductive members to interact with corresponding ones of the second plurality of teeth protruding from the rotary input control.

12. The method of claim 10 wherein the permanent magnet is a first permanent magnet and the electropermanent magnet assembly further comprises a second permanent magnet, the first and second permanent magnets being aligned and cooperating with the magnetically conductive members to form a magnetic circuit.

13. The method of claim 12 wherein the user input device further comprises a shaft that couples the electropermanent magnet assembly to the rotary input control enabling the rotary input control to rotate with respect to the electropermanent magnet assembly.

14. The method of claim 9 wherein the first resistance profile applies a free-wheeling force to the rotary input control and the second resistance profile applies a ratcheting force to the rotary input control.

15. The method of claim 9 wherein the first resistance profile is applied by interaction between a magnetic field emitted by the electropermanent magnet assembly and magnetically attractable materials of the rotary input control.

16. The method of claim 9 wherein the user input device is a computer mouse and the rotary input control is a scroll wheel embedded within the computer mouse.

17. A computer mouse comprising:
   a rotary input control, comprising: a wheel; and
   an electropermanent magnet (EPM) assembly, comprising:
      two or more permanent magnets; and
      a magnetizing assembly configured to control a polarization of each of the two or more permanent magnets via an electrical current to transition the electropermanent magnet assembly between a plurality of operating states in which the EPM assembly is operable to apply any of a plurality of resistance profiles to the wheel based on how each of the two or more permanent magnets are polarized by the magnetizing assembly, wherein the magnetizing assembly is operable to polarize each of the two or more permanent magnets such that each of the two or more permanent magnets either emits or does not emit a magnetic field; and magnetically conductive members positioned at opposing ends of the electropermanent magnet assembly, each magnetically conductive member comprising a respective plurality of teeth protruding radially toward the wheel, and wherein each of the magnetically conductive members comprises a respective magnetic pole having a particular magnitude depending on a polarized state of the EPM assembly.

* * * * *